US012659282B2

(12) United States Patent
Coady et al.

(10) Patent No.: US 12,659,282 B2
(45) Date of Patent: Jun. 16, 2026

(54) DYNAMIC DEPLOYMENT OF VIRTUAL NETWORKS FOR EDGE DEVICES

(71) Applicant: RED HAT, INC., Raleigh, NC (US)

(72) Inventors: Stephen Coady, Waterford (IE);
Archana Ravindar, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 99 days.

(21) Appl. No.: 18/583,168

(22) Filed: Feb. 21, 2024

(65) Prior Publication Data

US 2025/0267107 A1 Aug. 21, 2025

(51) Int. Cl.
*H04L 47/762* (2022.01)
*H04L 47/80* (2022.01)

(52) U.S. Cl.
CPC .......... H04L 47/762 (2013.01); H04L 47/805 (2013.01)

(58) Field of Classification Search
CPC ............................ H04L 47/762; H04L 47/805
See application file for complete search history.

(56) References Cited

U.S. PATENT DOCUMENTS

| | | | |
|---|---|---|---|
| 2008/0056130 A1* | 3/2008 | Desai ................. | H04L 47/2441 |
| | | | 370/231 |
| 2010/0085874 A1* | 4/2010 | Noy ........................ | H04L 47/70 |
| | | | 370/230 |

| | | | |
|---|---|---|---|
| 2015/0250016 A1* | 9/2015 | Kotecha ................ | H04W 72/56 |
| | | | 370/329 |
| 2017/0163544 A1* | 6/2017 | Bhandarkar ........ | H04L 47/2433 |
| 2019/0044882 A1* | 2/2019 | Poorchandran ......... | H04L 47/80 |
| 2019/0075042 A1* | 3/2019 | Burns ................. | H04L 43/0829 |
| 2021/0194988 A1* | 6/2021 | Chaysinh ............ | H04L 41/5025 |
| 2021/0328934 A1* | 10/2021 | Guim Bernat ........ | H04L 67/564 |
| 2021/0345357 A1* | 11/2021 | Ijntema ................. | H04L 47/781 |
| 2021/0409335 A1* | 12/2021 | Zhu .......................... | H04L 47/24 |
| 2022/0086071 A1* | 3/2022 | Sivaraman ............ | H04L 43/065 |
| 2022/0255900 A1* | 8/2022 | Gupta ................... | H04L 63/105 |
| 2023/0171203 A1* | 6/2023 | Kalam ................. | H04L 47/821 |
| | | | 370/235 |
| 2023/0300205 A1* | 9/2023 | Sivaswamy ........... | G06F 9/5072 |
| | | | 709/224 |

* cited by examiner

*Primary Examiner* — Chris Parry
*Assistant Examiner* — Steven C Nguyen
(74) *Attorney, Agent, or Firm* — Kilpatrick Townsend & Stockton LLP

(57) ABSTRACT

Cloud networks can be dynamically deployed for edge computing environments. For example, a control plane of a computing environment can detect a set of device identifiers and a set of priority levels for data transmitted by a set of edge devices in the computing environment. Each device identifier can correspond to an edge device in the set of edge devices. A network deployment service of the control plane can determine a network weight for the set of edge devices based on a set of device identifiers and the set of priority levels. The network deployment service can determine an adjustment to a virtual gateway based on the network weight. The virtual gateway can transmit data from the set of edge devices to a compute node in the computing environment. The network deployment service can execute the adjustment to the virtual gateway.

20 Claims, 4 Drawing Sheets

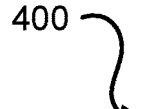

400

---

402
Detect, by a control plane of a computing environment, a set of device identifiers and a set of priority levels for data transmitted by a set of edge devices in the computing environment, each device identifier of the set of device identifiers corresponding to an edge device of the set of edge devices

---

404
Determine, by a network deployment service of the control plane, a network weight for the set of edge devices based on the set of device identifiers and the set of priority levels

---

406
Determine, by the network deployment service and based on the network weight, an adjustment to a virtual gateway configured to transmit data from the set of edge devices to a compute node in the computing environment

---

408
Execute, by the network deployment service, the adjustment to the virtual gateway

DYNAMIC DEPLOYMENT OF VIRTUAL NETWORKS FOR EDGE DEVICES

TECHNICAL FIELD

The present disclosure relates generally to edge computing environments. More specifically, but not by way of limitation, this disclosure relates to dynamically deploying cloud networks in edge computing environments.

BACKGROUND

Distributed computing systems (e.g., cloud computing systems, data grids, and computing clusters) have recently grown in popularity given their ability to improve flexibility, responsiveness, and speed over conventional computing systems. In some cases, the responsiveness and speed of distributed computing systems can be further improved by employing edge-computing solutions. Edge computing is a networking philosophy focused on bringing computing power and data storage as close to the source of the data as possible to reduce latency and bandwidth usage. Distributed computing environments may employ edge devices to perform various functions at the edge.

BRIEF DESCRIPTION OF THE DRAWINGS

FIG. 4 is a flow chart of an example of a process for dynamically deploying virtual networks in an edge computing environment, according to some aspects of the present disclosure.

DETAILED DESCRIPTION

Figure 1:
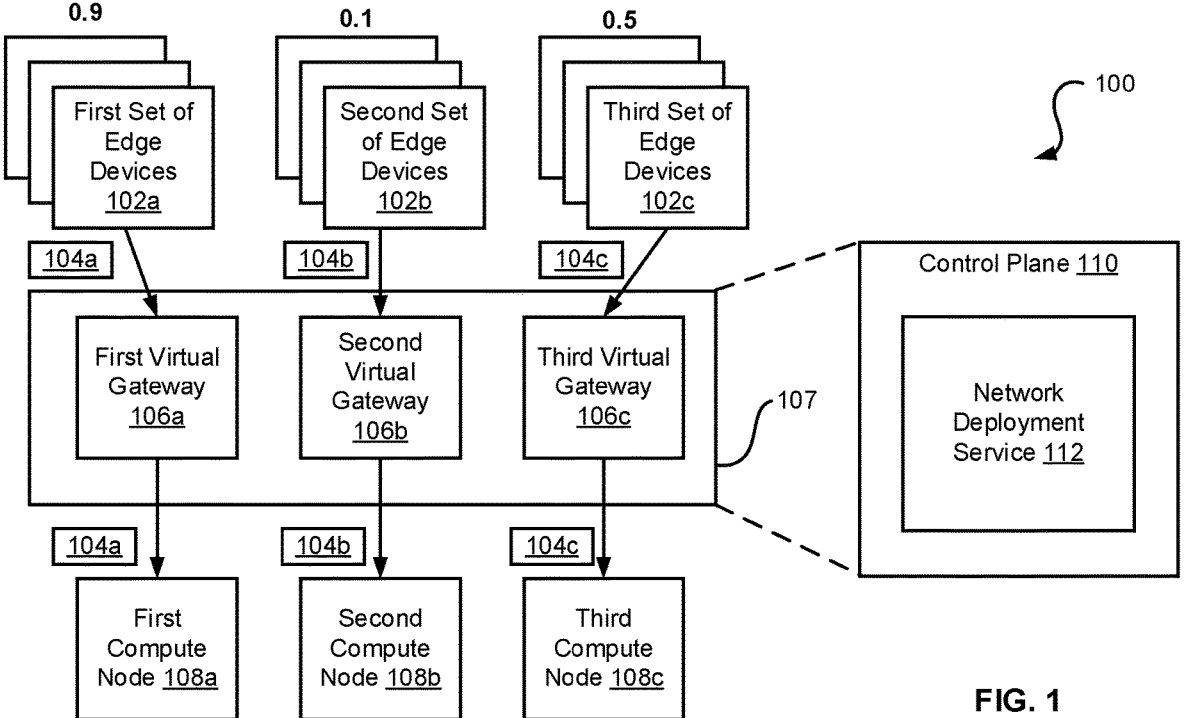
FIG. 1 is a block diagram of an example of an edge computing environment for dynamically deploying virtual networks, according to some aspects of the present disclosure.

Transmitting data generated by edge devices (e.g., via a cloud network) of a distributed computing environment may be computationally expensive. The cloud network can include instances of virtual gateways that can route the data to various compute nodes that can process the data. In some cases, a distributed computing environment can include thousands, tens of thousands, or even millions of edge devices. Active edge devices may generate up to thousands of data packets per second. But the quantity of data generated by edge devices may, in some cases, be at odds with the importance of the data. Therefore, deploying virtual gateways based solely on network traffic may cause transmission of lower priority, high volume data (e.g., temperature fluctuations detected by smart home thermostats) to be prioritized over higher priority, low volume data (e.g., notifications generated by life support devices in a hospital). Although some data packets generated by edge devices may be tagged with priority levels, these priority levels are consumed at the application level (e.g., by applications executed by the compute nodes that receive the data packets), not at a system level.

Some examples of the present disclosure can overcome one or more of the abovementioned problems by using a network deployment service executed by a control plane for the cloud network. The network deployment service can determine network weights for groups of edge devices and can dynamically deploy instances of virtual gateways based on the network weights. The network weights can be based on multiple factors, including device concentration, number of devices, latency amount of network traffic generated, priority level for the data, data trends, and any other suitable metric. As network weights are adjusted over time (e.g., in response to network traffic or priority levels changing), the network deployment service may instantiate or terminate instances of the virtual gateways at various locations. This can allow the control plane to position critical infrastructure closer to high-priority edge devices to significantly reduce latency of data transmission and increase computing power for new instances of virtual gateways.

In a particular example, an electrical grid can include edge devices such as electrical meters at homes or businesses. The electrical meters can detect measurements for the electrical grid and can transmit notifications when power is not detected. Such notifications may be transmitted as data packets that are tagged as high priority. As such electrical meters may only generate data to be transmitted in the event of a power outage, it may not be beneficial to continuously include a large number of virtual gateways for the electrical meters in a network for the electrical grid. But, when a power outage occurs, it may be beneficial to prioritize transmission of data packets from the electrical meters. Additional virtual gateways may be needed to transmit most or all data packets with low latency and without dropping or queueing the data packets.

In some examples, a network deployment service executing at a control plane of the network can generate a network weight that can be assigned to the electrical meters. The network deployment service can use the network weight to determine the number and location of virtual gateways to deploy at various locations in the network. The network weight may include several weightings and may change over time. Adjustments to the network weight may cause the network deployment service to terminate or instantiate additional instances of virtual gateways. These adjustments can include a change in data priority level, concentration or number of edge devices, resource consumption (e.g., amount of network traffic, CPU usage, or latency), or any other factor that may be included when determining network weight.

In this particular example, the network weight may include a weighting for the average priority level of data packets generated by the electrical meter (e.g., a high priority level for outage notifications) over a period of time. Higher average priority levels can increase the network weight, which may result in additional the network deployment service generating additional instances of virtual gateways for the electrical meters. When the average priority level drops (e.g., because the electrical meters are no longer transmitting outage notifications once power to the electrical grid is restored), the network weight may adjust to a lower value. This can prompt the network deployment service to terminate some or all of the virtual gateways for the electrical meters. The network weight may also include a weighting that causes the network weight to be relatively high if any network traffic (e.g., outage notifications) is being generated, regardless of the number of data packets.

The network weight may be adjusted based on any other weighted factor. In some examples, different types of edge devices may have network weights that are calculated in different ways. For example, edge devices such as smart thermostats that produce a relatively high (e.g., thousands per second) amount of network traffic that is relatively low priority (e.g., home temperature readouts) can have a network weight that does not weight latency as heavily as the network weight for the electrical meters. This is because relatively high latency for high volume, low priority edge devices may be more acceptable than high latency for low or intermittent volume, high priority edge devices.

In the interest of clarity of explanation, embodiments described herein are discussed in relation to edge computing environments. Embodiments of the present disclosure may similarly or equivalently apply to any computing environment, including distributed computing environments and cloud computing environments, in which dynamically distributing cloud networks may be beneficial.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of an edge computing environment 100 for dynamically deploying virtual networks, according to some aspects of the present disclosure. The edge computing environment 100 can include one or more edge devices that include limited computing resources (e.g., RAM, storage, processing power, etc.). In some examples, edge devices may include no storage and may immediately transmit data after generation, such as to compute nodes 108a-c that can process the data. Examples of edge devices can include sensors, actuators, thermometers, controllers, scanners, medical devices, scientific instruments, routers, network access devices, desktop computers, laptop computers, servers, mobile phones, tablets, and the like. Components within the edge computing environment 100 may be communicatively coupled via a network 107, such as a local area network (LAN), wide area network (WAN), the Internet, or any suitable network.

The edge computing environment 100 depicted in FIG. 1 can include multiple sets of edge devices. For example, a first set of edge devices 102a can include life-support sensors in a hospital. The first set of edge devices 102a can generate first data packets 104a that indicate status of the life-support sensors. The first data packets 104a can be transmitted via the network 107 to a first compute node 108a that monitors the first set of edge devices 102a. In some examples, one or more instances of a first virtual gateway 106a in the network 107 can transmit the first data packet 104a from the first set of edge devices 102a to the first compute node 108a.

A second set of edge devices 102b can include smart lightbulbs in homes or businesses that can be remotely controlled (e.g., by a second compute node 108b) to turn off or on. The second set of edge devices 102b may transmit second data packets 104b indicating whether a smart lightbulb is turned off or on to one or more instances of a second virtual gateway 106b in the network 107. The second virtual gateway 106b can transmit the second data packets 104b to the second compute node 108b. In some examples, the second virtual gateway 106b may additionally transmit data packets from the second compute node 108b to the second set of edge devices 102b.

A third set of edge devices 102c can include electrical meters that measure power status of an electrical grid (e.g., positioned at homes or businesses). When a power outage occurs, the third set of edge devices 102c may transmit third data packets 104c to a third compute node 108c that monitors power outages. For example, the third data packets 104c may be transmitted to the third compute node 108c via one or more instances of a third virtual gateway 106c in the network 107.

Figure 2:
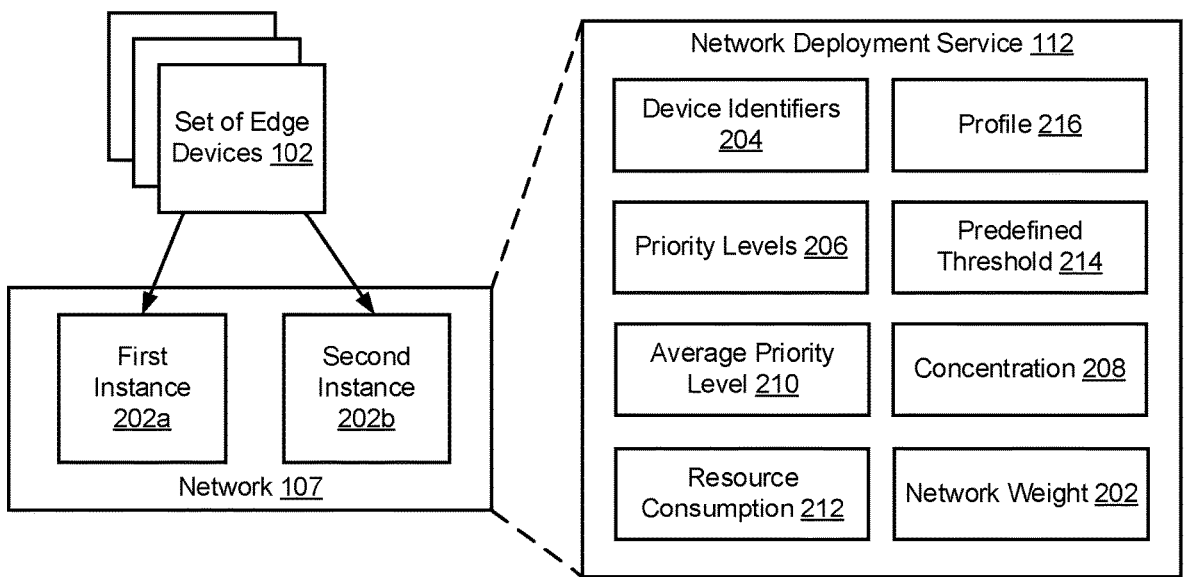
FIG. 2 is a flow diagram of an example of a network deployment service for an edge computing environment, according to some aspects of the present disclosure.

The location and number of virtual gateways 106a-c deployed in the network 107 may be configured by the control plane 110. In particular, a network deployment service 112 executed by the control plane 110 can monitor and deploy virtual gateways 106a-c by determining a network weight for each of the sets of edge devices 102a-c. FIG. 2 depicts an example of the network deployment service 112 in the edge computing environment 100, according to some aspects of the present disclosure. The network deployment service 112 may determine a network weight 202 based on various factors that can be weighted. The network weight 202 can be used to determine a number of instances 202a-b to deploy for the set of edge devices 102. For example, a set of edge devices with a relatively high network weight may have a higher number of virtual gateways than another set of edge devices with a lower network weight.

In some examples, the network weight 202 can be determined based on device identifiers 204 and priority levels 206 detected for data packets transmitted by the set of edge devices 102. Device identifiers 204 may indicate a type of edge device (e.g., life-support sensor, smart lightbulb, electrical meter) or an internet protocol (IP) address for the edge device. Thus, the network deployment service 112 may determine a concentration 208 or a number of edge devices in the set of edge devices 102 using the device identifiers 204. The network deployment service 112 may also determine an average priority level 210 of data packets transmitted by the set of edge devices 102 (e.g., over a set period of time, such as one minute or one week). The concentration 208 and average priority level 210 can also be used to determine the network weight 202. In some examples, the network deployment service 112 may detect additional metrics that can be used to determine the network weight 202.

For example, the network deployment service 112 may monitor a resource consumption 212 (e.g., CPU usage, latency, or amount of network traffic) of the instances 202a-b of the virtual gateway assigned to the set of edge devices 102. If the resource consumption 212 exceeds or falls below a predefined threshold 214, the network weight 202 may be adjusted. In some examples, the network deployment service 112 may also generate a profile 216 tracking network traffic and priority levels 206 for the set of edge devices 102 over time. The profile 216 can indicate a level of continuous priority for data packets generated by the set of edge devices 102. For example, some edge devices may consistently produce low priority data packets. Other edge devices may only transmit data packets intermittently (e.g., once per month or year), but such data packets may be high priority.

Each factor (e.g., device identifiers 204, priority levels 206, concentration 208, average priority levels 210, resource consumption 212, profiles 216, or any other suitable factor) used to determine the network weight 202 can be paired with a weighting. These weightings may differ between different sets of edge devices. Referring back to the example depicted in FIG. 1, the first set of edge devices 102a (e.g., life-support sensors) may have a relatively high concentration 208 of edge devices within a hospital. In some examples, the first set of edge devices 102a may include thousands or tens of thousands of edge devices that are producing a relatively high volume of network traffic. Additionally, life-support sensors may produce first data packets 104a with a relatively high priority level 206. The network deployment service 112 can monitor the first set of edge devices 102a to determine a profile 216 indicating that the average priority level 210 for the first data packets 104 is consistently high over time. Because the average priority level 210 is consistently high over time, the network weight 202 for the first set of edge devices 102a can be heavily weighted such that regardless of network traffic occurring in other sets of edge devices, the first set of edge devices 102a has enough instances of the first virtual gateway 106a to prevent latency from exceeding a predefined threshold. In the example depicted in FIG. 1, the network deployment service 112 can determine a network weight of 0.9 (e.g., out of 1.0) for the first set of edge devices 102a.

The second set of edge devices 102b (e.g., smart light-bulbs relaying on or off status) may have a relatively low concentration 208, such as hundreds or thousands of edge devices in one city. In some examples, the second set of edge devices 102b may produce an amount of network traffic that is significantly larger than the first set of edge devices 102a or the third set of edge devices 102c. For example, each of the second set of edge devices 102b may produce hundreds or thousands of second data packets 104b per second. But, the second data packets 104b may have a relatively low average priority level 210. It may not be beneficial to prioritize transmission of the significant volume of second data packets 104b, particularly compared to the first data packets 104a or third data packets 104c. Thus, a weighting for resource consumption 212 for the network weight for the second set of edge devices 102b may be lower than a weighting for resource consumption for the first set of edge devices 102a.

For example, a relatively high latency for the second set of edge devices 102b that causes some second data packets 104b to be dropped or queued may have less significant consequences than dropping first data packets 104a indicating life support status for hospital patients. Thus, the network deployment service 112 may not heavily weight latency minimization for the network weight determined for the second set of edge devices 102b. The network weight for the second set of edge devices 102b may be relatively low (e.g., 0.1 out of 1.0). If the network weights for the first set of edge devices 102a or the third set of edge devices 102c increases by more than a threshold amount, the network deployment service 112 may automatically terminate some or all of the instances of the second virtual gateway 106b to free up resources to provide additional instances to the first set of edge devices 102a or third set of edge devices 102c.

The third set of edge devices 102c (e.g., electrical meters for houses or businesses) may include a large (e.g., hundreds of thousands or millions) number of edge devices spread out over a relatively large area (e.g., across a state or country), thus having a low concentration. The network deployment service 112 may monitor the third set of edge devices 102c over time and may determine that the third set of edge devices 102c are not consistently producing third data packets 104c. Thus, it may not be beneficial to have a high number of instances of the third virtual gateway 106c for the typically low amount of network traffic. But, the profile 216 generated by the network deployment service 112 may indicate that the third set of edge devices 102c may inter-mittently (e.g., once a month or year) produce spikes of third data packets 104c with relatively high priority levels 206. So, the network deployment service 112 may configure the network weight for the third set of edge devices 102c to have a relatively medium network weight (e.g., 0.5 out of 1.0) when the average priority level 210 of third data packets 104c is low, and to have a relatively high (e.g., 0.9 out of 1.0) network weight once the average priority level 210 exceeds a predefined threshold 214. If the network weight for the third set of edge devices 102c increases from 0.5 to 0.9 while the network weight for the second set of edge devices 102b remains at 0.1, the network deployment service 112 may automatically terminate one or more instances of the second virtual gateway 106b and instantiate additional instances of the third virtual gateway 106c.

Resources for the network 107 can therefore be dynami-cally adjusted based on the various network weights. For example, the network deployment service 112 may deter-mine that a first network weight (e.g., 0.9) for the first set of edge devices 102a is greater than a second network weight (e.g., 0.1) for the second set of edge devices 102b. The network deployment service 112 may also determine that a first number of instances of the first virtual gateway 106a is less than a second number of instances of the second virtual gateway 106b. This may be because the second set of edge devices 102b produces a significantly higher volume of network traffic than the first set of edge devices 102a. But, allocating instances of virtual gateways based solely on network traffic may cause low-priority data transmission (e.g., lightbulb status readings) to be prioritized over high-priority data transmission (e.g., life-support sensor read-ings). Thus, the network deployment service 112 can remove one or more instances of the second virtual gateway 106b and add one or more instances of the first virtual gateway 106a based on determining that the first network weight is greater than the second network weight and that the first number of instances of the first virtual gateway 106a is greater than the second number of instances of the second virtual gateway 106b.

Figure 3:
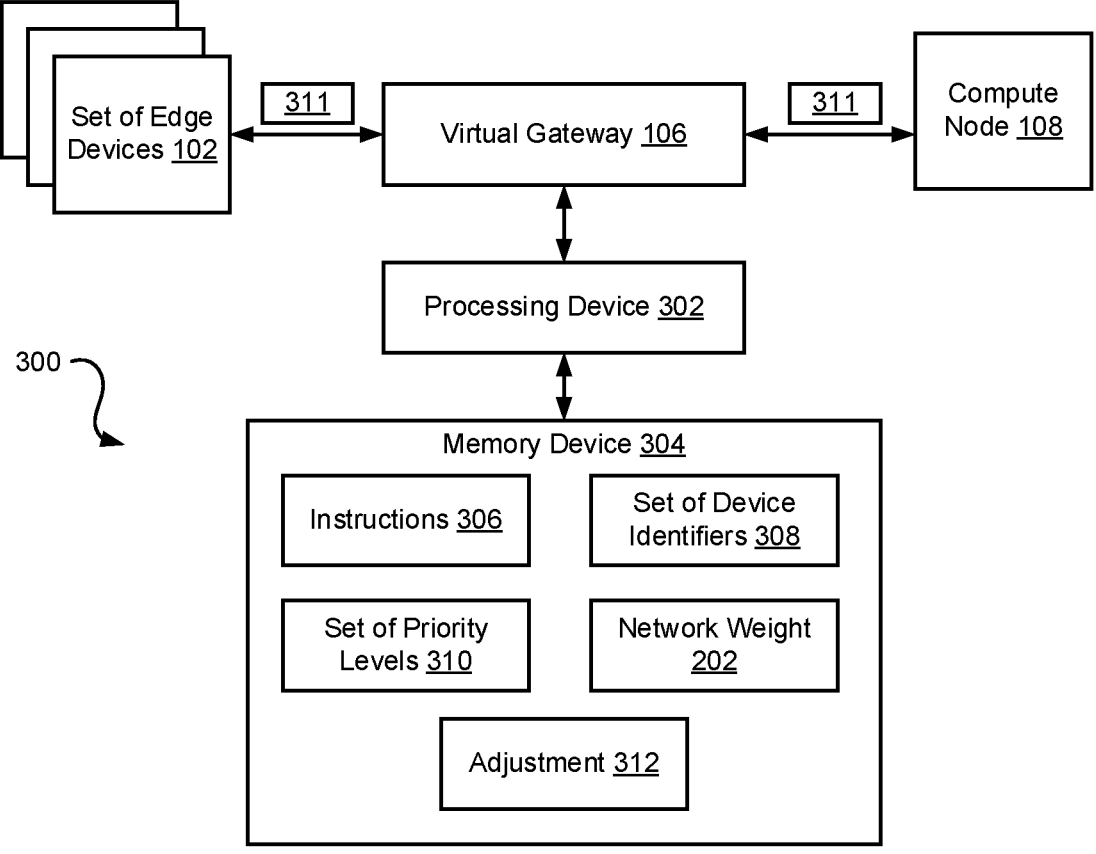
FIG. 3 is a block diagram of a computing environment for dynamically deploying virtual networks, according to some aspects of the present disclosure.

FIG. 3 is a block diagram of a computing environment 300 for dynamically deploying virtual networks, according to some aspects of the present disclosure. The computing environment 30 can include a processing device 302 com-municatively coupled to a memory device 304.

The processing device 302 can include one processing device or multiple processing devices. The processing device 302 can be referred to as a processor. Non-limiting examples of the processing device 302 include a Field-Programmable Gate Array (FPGA), an application-specific integrated circuit (ASIC), and a microprocessor. The pro-cessing device 302 can execute instructions 306 stored in the memory device 304 to perform operations. In some examples, the instructions 306 can include processor-spe-cific instructions generated by a compiler or an interpreter from code written in any suitable computer-programming language, such as C, C++, C#, Java, Python, or any com-bination of these.

The memory device 304 can include one memory device or multiple memory devices. The memory device 304 can be non-volatile and may include any type of memory device that retains stored information when powered off. Non-limiting examples of the memory device 304 include elec-trically erasable and programmable read-only memory (EE-PROM), flash memory, or any other type of non-volatile memory. At least some of the memory device 304 includes a non-transitory computer-readable medium from which the processing device 302 can read instructions 306. A com-puter-readable medium can include electronic, optical, mag-netic, or other storage devices capable of providing the processing device 302 with the instructions 306 or other program code. Non-limiting examples of a computer-read-able medium include magnetic disk(s), memory chip(s), ROM, random-access memory (RAM), an ASIC, a configured processor, and optical storage.

In some examples, the processing device 302 (executing at a control plane of the computing environment 300) can detect a set of device identifiers 308 and a set of priority levels 310 for data 311 transmitted by a set of edge devices 102 in the computing environment 300. Each device identifier of the set of device identifiers 308 can correspond to an edge device of the set of edge devices 102. The processing device 302 can determine a network weight 202 for the set of edge devices 102 based on the set of device identifiers 308 and the set of priority levels 310. The processing device 302 can determine, based on the network weight 202, an adjustment 312 to a virtual gateway 106 that transmits data 311 from the set of edge devices 102 to a compute node 108 in the computing environment 300. The processing device 302 can execute the adjustment 312 to the virtual gateway 106.

FIG. 4 is a flow chart of an example of a process for dynamically deploying virtual networks in a computing environment 300, according to some aspects of the present disclosure. In some examples, the processing device 302 can perform one or more of the steps shown in FIG. 4. In other examples, the processing device 302 can implement more steps, fewer steps, different steps, or a different order of the steps depicted in FIG. 4. The steps of FIG. 4 are described below with reference to components discussed above in FIGS. 1-3.

At block 402, the processing device 302 can detect a set of device identifiers 308 and a set of priority levels 310 for data 311 transmitted by a set of edge devices 102 in the computing environment 300. The processing device 302 may execute a control plane 110 of the computing environment 300. Each device identifier in the set of device identifiers 308 may correspond to an edge device of the set of edge devices 102. The set of edge devices 102 may include smart thermometers that can transmit temperature readings to a compute node 108. The compute node 108 may execute an application that can allow a user to remotely view the temperature readings and remotely control the smart thermometer (e.g., by adjusting the temperature). Each smart thermometer in the set of edge devices 102 may transmit a relatively high amount of network traffic (e.g., thousands of temperature readings per second). But, the data 311 may, on average, be tagged with low priority levels.

At block 404, the processing device 302, which may execute a network deployment service 112 of the control plane 110, can determine a network weight 202 for the set of edge devices 102 based on the set of device identifiers 308 and the set of priority levels 310. For example, the processing device 302 may determine a concentration and number of edge devise in the set of edge devices 102 based on the set of device identifiers 308. The number may be relatively high (e.g., in the thousands) but the concentration may be relatively low (e.g., thousands of smart thermometers spread out over a city). Low device concentration can be associated with a relatively low network weight 202.

Further, the set of priority levels 310 can be tracked over time. The processing device 302 may determine that an average priority level of data 311 transmitted by the set of edge devices 102 over a period of time is relatively low. This can also be associated with a relatively low network weight 202. Thus, the processing device 302 can generate a network weight 202 for the set of edge devices 102 that is relatively low (e.g., 0.2 out of 1.0).

At block 406, the processing device 302 can determine, based on the network weight 202, an adjustment 312 to a virtual gateway 106 configured to transmit data 311 from the set of edge devices 102 to a compute node 108 in the computing environment 300. The adjustment 312 may involve reducing a number of instances of the virtual gateway 106. In typical computing environments, the set of edge devices 102 may have a high number of instances of the virtual gateway, in order to process the relatively high (e.g., thousands per second) amount of network traffic. But, ensuring that low-priority data such as temperature readings are transmitted with as little latency as possible may cause transmission of other, more high-priority and lower volume data such as life-support sensor readings to be de-prioritized. Thus, dynamically adjusting deployment of virtual gateways based on additional factors such as device identifiers, priority levels, and behavior over time may allow beneficial adjustments to be made at a control plane level of the computing environment 300.

At block 408, the processing device 302 can execute the adjustment 312 to the virtual gateway 106. For example, the network deployment service 112 can terminate an instance of the virtual gateway 106 for the set of edge devices 102. This may increase latency for transmitting data 311 from the set of edge devices 102. But, because terminating the instance of the virtual gateway 106 can free up resources in the computing environment 300, the network deployment service 112 can add an instance of another virtual gateway for another set of edge devices that may be transmitting higher-priority data, such as power outage notifications. If the network weight 202 for the set of edge devices 102 increases at a later time (e.g., in response to the average priority level 210 for the data 311 changing by more than a predefined threshold 214 over a period of time), the processing device 302 may determine another adjustment that may involve adding a new instance of the virtual gateway 106 for the set of edge devices 102.

In some examples, the processing device 302 may automatically execute the adjustment 312 to the virtual gateway 106 in response to the network weight 202 changing by more than a threshold amount. For example, if the network weight 202 for the set of edge devices 102 changes from 0.3 to 0.9, the processing device 302 may automatically instantiate ten more instances of the virtual gateway 106. In some examples, the processing device 302 may additionally or alternatively send out alerts or notifications indicating that the network weight 202 has changed by more than the threshold amount.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processing device; and
a memory comprising instructions that are executable by the processing device for causing the processing device to:
   detect, by a control plane of a computing environment, a set of device identifiers and a set of priority levels for data transmitted by a set of edge devices in the computing environment, the set of device identifiers indicating a type of edge device for the set of edge devices;

determine, by a network deployment service of the control plane, a network weight for the set of edge devices based on the set of device identifiers and the set of priority levels;

monitor an average priority level of data transmitted by the set of edge devices;

adjust the network weight for the set of edge devices based on the average priority level;

determine, by the network deployment service and based on the network weight, an adjustment to a virtual gateway configured to transmit data from the set of edge devices to a compute node in the computing environment; and execute, by the network deployment service, the adjustment to the virtual gateway.

2. The system of claim 1, wherein the memory further comprises instructions that are executable by the processing device for causing the processing device to:

determine that the average priority level of data transmitted by the set of edge devices over a period of time has changed by more than a predefined threshold over the period of time, wherein the network weight is adjusted for the set of edge devices based on the average priority level changing by more than the predefined threshold over the period of time.

3. The system of claim 1, wherein the memory further comprises instructions that are executable by the processing device for causing the processing device to:

determine a concentration of the set of edge devices based on the set of device identifiers; and determine the network weight for the set of edge devices based on the concentration.

4. The system of claim 1, and wherein the memory further comprises instructions that are executable by the processing device for causing the processing device to:

determine that a resource consumption of the virtual gateway for the set of edge devices exceeds a predefined threshold; and adjust the network weight for the set of edge devices based on the resource consumption.

5. The system of claim 1, wherein the virtual gateway is a first instance, and wherein the memory further comprises instructions that are executable by the processing device for causing the processing device to execute the adjustment to the virtual gateway by:

adding a second instance of the virtual gateway for the set of edge devices; or removing the first instance of the virtual gateway for the set of edge devices.

6. The system of claim 1, wherein the set of edge devices is a first set of edge devices, the virtual gateway is a first virtual gateway, and the network weight is a first network weight, and wherein the memory further comprises instructions that are executable by the processing device for causing the processing device to:

determine that the first network weight for the first set of edge devices is greater than a second network weight for a second set of edge devices in the computing environment; and determine that a first number of instances of the first virtual gateway is less than a second number of instances of a second virtual gateway for the second set of edge devices.

7. The system of claim 6, wherein the memory further comprises instructions that are executable by the processing device for causing the processing device to, in response to determining that the first network weight is greater than the second network weight and that the first number of instances is less than the second number of instances:

remove one or more instances of the second virtual gateway; and add one or more instances of the first virtual gateway.

8. A method comprising:

detecting, by a control plane of a computing environment, a set of device identifiers and a set of priority levels for data transmitted by a set of edge devices in the computing environment, the set of device identifiers indicating a type of edge device for the set of edge devices;

determining, by a network deployment service of the control plane, a network weight for the set of edge devices based on the set of device identifiers and the set of priority levels;

monitoring, by the network deployment service, an average priority level of data transmitted by the set of edge devices;

adjusting, by the network deployment service, the network weight for the set of edge devices based on the average priority level;

determining, by the network deployment service and based on the network weight, an adjustment to a virtual gateway configured to transmit data from the set of edge devices to a compute node in the computing environment; and executing, by the network deployment service, the adjustment to the virtual gateway.

9. The method of claim 8, further comprising:

determining that the average priority level of data transmitted by the set of edge devices over a period of time has changed by more than a predefined threshold over the period of time, wherein the network weight is adjusted for the set of edge devices based on the average priority level changing by more than the predefined threshold over the period of time.

10. The method of claim 8, further comprising:

determining a concentration of the set of edge devices based on the set of device identifiers; and determining the network weight for the set of edge devices based on the concentration.

11. The method of claim 8, further comprising:

determining that a resource consumption of the virtual gateway for the set of edge devices exceeds a predefined threshold; and adjusting the network weight for the set of edge devices based on the resource consumption.

12. The method of claim 8, wherein the virtual gateway is a first instance, and wherein the method further comprises executing the adjustment to the virtual gateway by:

adding a second instance of the virtual gateway for the set of edge devices; or removing the first instance of the virtual gateway for the set of edge devices.

13. The method of claim 8, wherein the set of edge devices is a first set of edge devices, the virtual gateway is a first virtual gateway, and the network weight is a first network weight, and wherein the method further comprises:

determining that the first network weight for the first set of edge devices is greater than a second network weight for a second set of edge devices in the computing environment; and determining that a first number of instances of the first virtual gateway is less than a second number of instances of a second virtual gateway for the second set of edge devices.

14. The method of claim 13, further comprising, in response to determining that the first network weight is greater than the second network weight and that the first number of instances is less than the second number of instances:

removing one or more instances of the second virtual gateway; and adding one or more instances of the first virtual gateway.

15. A non-transitory computer-readable medium comprising program code that is executable by a processing device for causing the processing device to:

detect, by a control plane of a computing environment, a set of device identifiers and a set of priority levels for data transmitted by a set of edge devices in the computing environment, indicating a type of edge device for the set of edge devices;

determine, by a network deployment service of the control plane, a network weight for the set of edge devices based on the set of device identifiers and the set of priority levels;

monitor, by the network deployment service, an average priority level of data transmitted by the set of edge devices;

adjust, by the network deployment service, the network weight for the set of edge devices based on the average priority level;

determine, by the network deployment service and based on the network weight, an adjustment to a virtual gateway configured to transmit data from the set of edge devices to a compute node in the computing environment; and execute, by the network deployment service, the adjustment to the virtual gateway.

16. The non-transitory computer-readable medium of claim 15, wherein the program code is further executable by the processing device for causing the processing device to:

determine that the average priority level of data transmitted by the set of edge devices over a period of time has changed by more than a predefined threshold over the period of time, wherein the network weight is adjusted for the set of edge devices based on the average priority level changing by more than the predefined threshold over the period of time.

17. The non-transitory computer-readable medium of claim 15, wherein the program code is further executable by the processing device for causing the processing device to:

determine a concentration of the set of edge devices based on the set of device identifiers; and determine the network weight for the set of edge devices based on the concentration.

18. The non-transitory computer-readable medium of claim 15, wherein the program code is further executable by the processing device for causing the processing device to:

determine that a resource consumption of the virtual gateway for the set of edge devices exceeds a predefined threshold; and adjust the network weight for the set of edge devices based on the resource consumption.

19. The non-transitory computer-readable medium of claim 15, wherein the virtual gateway is a first instance, and wherein the program code is further executable by the processing device for causing the processing device to execute the adjustment to the virtual gateway by:

adding a second instance of the virtual gateway for the set of edge devices; or removing the first instance of the virtual gateway for the set of edge devices.

20. The non-transitory computer-readable medium of claim 15, wherein the set of edge devices is a first set of edge devices, the virtual gateway is a first virtual gateway, and the network weight is a first network weight, and wherein the program code is further executable by the processing device for causing the processing device to:

determine that the first network weight for the first set of edge devices is greater than a second network weight for a second set of edge devices in the computing environment; and determine that a first number of instances of the first virtual gateway is less than a second number of instances of a second virtual gateway for the second set of edge devices.

* * * * *